United States Patent
Gloeckle (10) Patent No.: US 7,731,925 B2
(45) Date of Patent: *Jun. 8, 2010

(54) PROCESS FOR REDUCING AGENT CONTROL IN AN EXHAUST GAS AFTERTREATMENT SYSTEM

(75) Inventor: Markus Gloeckle, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 121 days.

This patent is subject to a terminal disclaimer.

(21) Appl. No.: 11/599,899

(22) Filed: Nov. 14, 2006

(65) Prior Publication Data

US 2007/0110653 A1    May 17, 2007

(30) Foreign Application Priority Data

| Nov. 14, 2005 | (DE) | ................ 10 2005 054 129 |
|---|---|---|
| Dec. 27, 2005 | (DE) | ................ 10 2005 062 556 |
| Apr. 24, 2006 | (DE) | ................ 10 2006 018 955 |
| May  4, 2006 | (DE) | ................ 10 2006 020 693 |
| May  9, 2006 | (DE) | ................ 10 2006 021 490 |
| May 11, 2006 | (DE) | ................ 10 2006 021 987 |
| May 12, 2006 | (DE) | ................ 10 2006 022 385 |
| May 17, 2006 | (DE) | ................ 10 2006 022 992 |
| May 18, 2006 | (DE) | ................ 10 2006 023 338 |
| Sep. 14, 2006 | (DE) | ................ 10 2006 043 082 |

(51) Int. Cl.
*B01D 53/56* (2006.01)
*B01D 53/94* (2006.01)

(52) U.S. Cl. ............. 423/213.2; 423/239.1; 422/105; 422/108; 422/111; 60/274; 60/282; 60/299; 60/301; 60/302

(58) Field of Classification Search ............ 423/213.2, 423/239.1, DIG. 5; 422/105, 108, 111; 60/274, 60/282, 299, 301, 302
See application file for complete search history.

(56) References Cited

U.S. PATENT DOCUMENTS

2004/0088970 A1* 5/2004 Mulligan ................ 60/286

(Continued)

FOREIGN PATENT DOCUMENTS

DE    101 39 142 A1    2/2003

(Continued)

OTHER PUBLICATIONS

Werner Weisweiler, "Elimination of Nitrogen Oxides from Oxygen-Containing Automotive Exhaust Gases", Chemistry Engineer Technology, vol. 72, Issue 5, pp. 441-449, 2000.

*Primary Examiner*—Timothy C Vanoy
(74) *Attorney, Agent, or Firm*—Merchant & Gould P.C.

(57) ABSTRACT

Methods of reducing agent control in an exhaust gas aftertreatment system of a combustion engine with an exhaust gas pipe in which in the direction of flow of the exhaust gas there is an SCR catalyzer. A reducing agent generating system has an $NO_x$ and $CO/H_2$ generating unit, an oxidation catalyzer, and a combined $NO_x$ storage/ammonia generating unit in the standard gas path of the reducing agent generating system. Ammonia is introduced as a reducing agent for the reduction of nitric oxides before the SCR catalyzer of the reducing agent generating system. Precursor materials for generation of ammonia are directed at least temporarily to the $NO_x$ and $CO/H_2$ generating unit through a fuel feed and an air feed. A $CO/H_2$ reducing agent stream is temporally modulated during a rich phase. A $CO/H_2$ concentration is primarily held constant at a high level.

17 Claims, 3 Drawing Sheets

U.S. PATENT DOCUMENTS

2004/0163377 A1  8/2004  Liu
2007/0028601 A1*  2/2007  Duvinage et al. ............. 60/286

FOREIGN PATENT DOCUMENTS

| DE | 199 22 961 C2 | 7/2003 |
| GB | 2375059 A * | 11/2002 |
| WO | WO 01/14702 A1 | 3/2001 |
| WO | 2004/071646 | 8/2004 |
| WO | 2005/103461 | 11/2005 |

* cited by examiner

PROCESS FOR REDUCING AGENT CONTROL IN AN EXHAUST GAS AFTERTREATMENT SYSTEM

The invention concerns a process for reducing agent control in an exhaust gas aftertreatment system of a combustion engine with an exhaust gas pipeline, in which an SCR catalyst is provided in the direction of flow of the exhaust gas, whereby a reducing agent generation system (RGS) has an $NO_x$ and $CO/H_2$ generation unit, an oxidation catalyst (cPOx), and a combined $NO_x$ storage/ammonia generation unit (AGC) in the standard gas path of the reducing agent generation system, and for reduction of nitric oxides before the SCR catalyst ammonia is introduced as a reducing agent from the reducing agent generation system, whereby raw material for generation of the ammonia is at least sometimes introduced into the $NO_x$ and $CO/H_2$ generating unit through a fuel feed and through an air feed.

To reduce the amount of nitric oxides in the exhaust of lean bum engines, $NO_x$ storage catalysts, which are also called $NO_x$ storage/reduction catalysts or NSC. These $NO_x$ storage catalysts work discontinuously in mode consisting of two phases. In the first, longer phase, the so-called lean phase (lambda>1), the nitric oxides contained in the exhaust from the engine are stored. In the second, shorter phase, the so-called rich phase (lambda<1), the stored nitric oxides are regenerated using a rich exhaust generated within the engine. During regeneration, the usual operation of an NSC converts the stored nitric oxides into nothing more than nitrogen ($N_2$), water ($H_2O$), and carbon dioxide ($CO_2$).

It is well-known that under unfavorable conditions for regeneration, such as for very long regeneration and/or small lambda ($\lambda$=0.8), a rather small part of the stored $NO_x$ can be converted into ammonia ($NH_3$). In this case, however, $NH_3$ formation is an undesired parasitic effect.

In connection with future legal requirements regarding nitric oxide emissions from motor vehicles, appropriate exhaust aftertreatment is necessary. Selective catalytic reduction (SCR) can be used to reduce $NO_x$ emissions ($NO_x$ removal) from combustion engines, particularly diesel engines, with temporarily primarily lean, that is, oxygen-rich, exhaust. Here, a defined amount of a selectively active reducing agent is added to the exhaust gas. This can, for instance, be in the form of ammonia, which is introduced directly in gaseous form, or it can be a product of a precursor substance in the form of urea or from a urea/water solution (HWL). Such HWL-SCR systems have been first used in the utility vehicle segment.

DE 10139142 A1 describes an exhaust gas purification system for a combustion engine in which an SCR catalyst is used to reduce $NO_x$ emissions, using the reducing agent ammonia to reduce the nitric oxides contained in the exhaust gas to nitrogen. The ammonia is obtained from the urea/water solution (HWL) in a hydrolysis catalyzer arranged upstream from the SCR catalyzer. The hydrolysis catalyzer converts the urea contained in the HWL to ammonia and carbon dioxide. In a second step, the ammonia reduces the nitric oxide to nitrogen, generating water as a byproduct. The exact process is sufficiently well described in the professional literature (see WEISSWELLER in CIT (72), pp. 441-449, 2000). The HWL is held ready in a reactant tank.

It is a disadvantage of this process that HWL is used during operation of the combustion engine. This consumption is about 4% that of the fuel consumption. The supply of urea/water solution would need to be sufficiently widespread, for instance at filling stations. Another disadvantage of the process is the operating temperature range required. The hydrolysis reaction of the urea/water solution takes place in quantity only above temperatures of 200° C. in the hydrolysis catalyzer as ammonia is released. These temperatures in the exhaust gas are reached with diesel engines, for instance, only after longer periods of operation. Due to precipitation, at temperatures less than 200° C. there may be blockages in the dosing unit, which can at least hinder the introduction of the urea/water solution into the exhaust gas pipe. Furthermore, dosing of urea/water solution at temperatures less than 200° C. can lead to suppression of the necessary catalytic properties in the hydrolysis catalyzer or in the SCR catalyzer due to a polymerization.

DE 199 22 961 C2 describes an exhaust gas purification system for the purification of the exhaust gas of a combustion source, particularly a vehicular combustion engine, at least of the nitric oxides contained therein, using an ammonia generation catalyst to generate ammonia using the components of at least a part of the exhaust gas emitted by the combustion source during ammonia generating operating phases and a nitric oxide reduction catalyzer downstream from the ammonia generating catalyzer for the reduction of the nitric oxides contained in the exhaust gas emitted by the combustion source using the ammonia generated as a reducing agent. A nitric oxide generation unit external to the combustion source is provided for the enrichment of the exhaust gas directed to the ammonia generating catalyzer with the nitric oxide generated during the ammonia generating operating phase. As a nitric oxide generation unit, for instance, a plasma generator is suggested for plasma oxidation of the nitrogen contained in the gas stream into nitric oxide. The hydrogen needed for generation of the ammonia is generated during the ammonia generating operating phases by operating the combustion source with a rich, that is, fuel-rich, air ratio.

The disadvantage of this process is the relatively high fuel consumption during the rich operating phase needed. Furthermore, a high energy requirement is necessary to provide nitric oxide externally to the engine, in particular because nitric oxide must be created in high concentration during the ammonia generating operating phase, which must be as brief as possible, and the remaining residual oxygen must be removed for the generation of ammonia at the cost of more energy. If the hydrogen is generated using a $PO_x$ catalyzer using a partial oxidation reformation ($PO_x$), there is an additional disadvantage from the heretofore low dynamics of hydrogen generation.

A plasma chemical process for the generation of a hydrogen-rich gaseous mixture is described in WO 01/14702 A1. Here, a spark is used to treat a rich fuel/air mixture, preferably under $PO_x$ conditions.

To avoid the introduction of an additional fuel, an as-yet unpublished paper by the registrant suggests a plasma process for on-board generation of reducing agents. Here, the ammonia needed for the reduction of the nitric oxides is generated from nontoxic substances in the vehicle as needed, then introduced into the SCR process. A solution acceptable from the fuel consumption standpoint offers a discontinuously operated process for ammonia generation, as is also suggested in this paper. This process will be called an RGS process (Reductant Generating System) or reducing agent generating system below.

An important component of an RGS unit is a catalyzer, which does work on the discontinuous basic principle of an $NO_x$ storage catalyzer (NSC), but is operated in such a way that the nitric oxides stored in the lean phase is converted directly to ammonia in the rich reduction phase, and not to nitrogen. The nitric oxides are generated in a nitric oxide generating unit under lean conditions from e.g. air, combined with a hydrogen/carbon monoxide generating unit into an $NO_x$ and $CO/N_2$ generating unit. This $CO/H_2$ generating unit is also called a reducing agent generating unit. The gas mixture emitted during this rich phase consists primarily of $H_2$, CO, and $H_2$ and is called reformate gas. The ammonia periodically (=cyclically) generated in this manner in an NSC is dosed into the engine's exhaust gas pipe and converted into $N_2$ with engine $NO_x$ in SCR catalyzer located downstream. Such an $NO_x$ storage catalyzer operated in an $NH_3$-maximized way will hereafter be called an AGC unit (AGC=ammonia generating catalyst).

The operating conditions of the AGC unit for targeted aummonia generation outside the exhaust gas pipe are very different from those of a conventional NSC in the full exhaust gas stream. The differences are primarily:

Roughly a 10- to 20-fold $NO_x$ (up to 1%) and $H_2/CO$ concentration (together about 40%)

A significantly higher standard global $NO_x$ loading density of the $NO_x$ storage catalyst (up to 2 g $NO_2$ per liter of AGC volume), and consequent Strongly exothermic heat tinges along the length of the catalyst in the AGC unit, with positive temperature gradient $\Delta T$ of over 100° C.

The ammonia yield in the AGC unit depends on the temperature flow to the AGC unit or the temperature profile along the length of the AGC unit, from the duration of the rich phase, from the concentration of reducing agent and from the catalyst formulation.

In an example reaction equation, the ammonia formation from stored $NO_x$ in the rich reduction phase using a barium-containing storage material can be formulated as This and the duration of the rich phase and the concentration of reducing agent show that the amount of $H_2/CO$ reducing agent used directly determines the $NH_3$ yield. According to today's state of the art, a (high) overdosing of the $H_2/CO$ reducing agent is necessary to obtain high ammonia yields.

Since the $H_2/CO$ mixture in the reducing agent generating unit, for instance, is generated from diesel fuel (represented by "$H_2C$") using catalytic partial oxidation on a so-called cPOx catalyst by (air) oxygen according to a minimization of the reducing agent overdosing is necessary to limit the added fuel consumption. Furthermore, the reducing agent overdose leads to increased secondary emissions, in particular of CO and similar hydrocarbons produced by the $H_2/CO$ generating unit and not converted in the AGC unit. For instance, impermissible levels of methane emissions may occur.

Sulfur content in the AGC unit can represent another potential negative effect on ammonia generating efficiency, which can particularly occur due to partial combustion of the diesel fuel.

Thus it is the task of the invention to provide a process to lower the secondary emissions emerging from the RGS unit, to limit overdosing of $H_2/CO$ and thus ultimately the added fuel consumption, and still maintain a high ammonia yield in the AGC unit. It is also the task of the invention to provide a process which enables a desulfatization of the AGC unit.

The task of the invention is solved in that a $CO/H_2$ reducing agent flow is temporally modulated during a rich phase with $\lambda<1$ serving as a reduction phase for the $NO_x$ storage/ammonia generating unit (AGC unit), whereby a $CO/H_2$ concentration is primarily held constant at a high level (>30%, typically around 40%). This operating method of the $NO_x$ storage/ammonia generating unit, the oxidation catalyst (cPOx) upstream of it, the air supply, and the fuel supply can reduce the secondary emissions (particularly CO and HC) produced by the RGS unit. Furthermore, even with high ammonia yields in the AGC unit, the overdosing of $H_2/CO$ and thus ultimately the added consumption of fuel can be limited. This can particularly be achieved if a constant lambda value is maintained during the power modulation in the oxidation catalyst (cPOx), which was unknown in previous operating strategies for RGS units regarding the particularly fast change/modulability of an air mass flow and thus also regarding an injected fuel amount.

A preferred embodiment provides that the rich phase is introduced by injecting fuel through the fuel introduction into the $NO_x$ and $CO/H_2$ generating unit with constant air flow, whereby in this reduction phase sufficient reducing agent can be provided. It is particularly preferred if the injection of fuel is performed with a relatively "rich" lambda value in the range between 0.33 and 0.45.

An advantageous process variant provides that after the start of fuel injection the air volume flow and the fuel mass flow are held constant for a time. If hereby the air volume flow and the fuel mass flow are held constant for at least 1 second and no more than 4 seconds, experience shows that under these conditions the largest amount of ammonia is already formed. This is typically already the case after 3 second.

If then the air volume flow and the fuel mass flow are continually reduced after the constant phase while maintaining the lambda value, a "fade out" of the total reformate case can be achieved with constant reformate gas composition. This ensures that the $NO_x$ storage/ammonia generation unit is impacted with a very high concentration (about 40%) of $H_2/CO$ even in this late phase of the rich pulse. This completes the formation of ammonia and rinses the ammonia adsorbed under rich conditions out of the AGC unit.

Alternatively to the previously described process variant, it can also be provided that the air volume flow and the fuel mass flow is continually reduced after the constant phase ("fade out") and that at the same time the lambda value is increased. Normally the lambda value is increased from a level in the range of 0.33 to 0.45 to a level in the range between 0.7 and 0.9, typically to 0.8. In this case, in contrast with the previously described variant, the injected fuel is returned overproportionally to the air volume, which is particularly advantageous with regards to the thermal load on the oxidation catalyst (cPOx), since this can thereby be reduced.

If, on the other hand, the lambda value is increased from a level in the range between 0.33 and 0.45 to a level in the range of $\lambda \geq 1$, this can induce a rinsing of the AGC unit with inert combustion products like $CO_2$ and $H_2O$.

According to the invention, in another process variant it can be the case that the rich phase is placed a maximum of 1 second previous to a phase with a lambda value lower or higher than the lambda value within the rich phase. During this previous phase, called a "lambda sweep", the air volume flow can also be held constant. This can influence the reformate gas flow, particularly at the beginning of the rich pulse.

In contrast to the previously described variants, it can be the case that at the beginning of the rich phase at a constant lambda value an initially increased air volume and fuel mass flow is set in comparison to the air volume and fuel mass flow set in the remaining time period of the rich phase. Thus the time modulation of the $H_2/CO$ performance can additionally be influenced in order to obtain, in the short time possible, optimum conditions for an efficiency-optimized ammonia generation in the AGC unit.

With respect to a desulfatization of the AGC unit, it has proved the case that, when the previously described process is used, generation of a variable lambda profile in the oxidation catalyzer and/or a periodic switch between a lean and a rich gas composition is advantageous, whereby a low secondary emissions (e.g. $H_2S$) desulfatization strategy can be implemented in the AGC unit.

In view of high precision and flexible adaptation to different operating states, it is particularly advantageous if the temporal modulation of the $CO/H_2$ reducing agent flow, the air volume and fuel mass flow, and the specification of the lambda value are controlled by a control unit, whereby hardware and software components can be used to specify an appropriate valve control characteristic for injection valves in the fuel injection as well as an appropriate performance characteristic for an air supply system for air introduction.

If the process is used for diesel engines or lean engines having a reducing agent generating system (on-board ammonia generation), the nitric oxide load can particularly be significantly reduced at low operating temperatures, which particularly significant is for diesel engines. But also for lean engines operated with normal or super gasoline fuels, the process can offer advantages in combination with the reducing agent generating system in the minimization of pollutants.

The invention is described in more detail below based on the embodiments shown in the figures.

Figure 1:
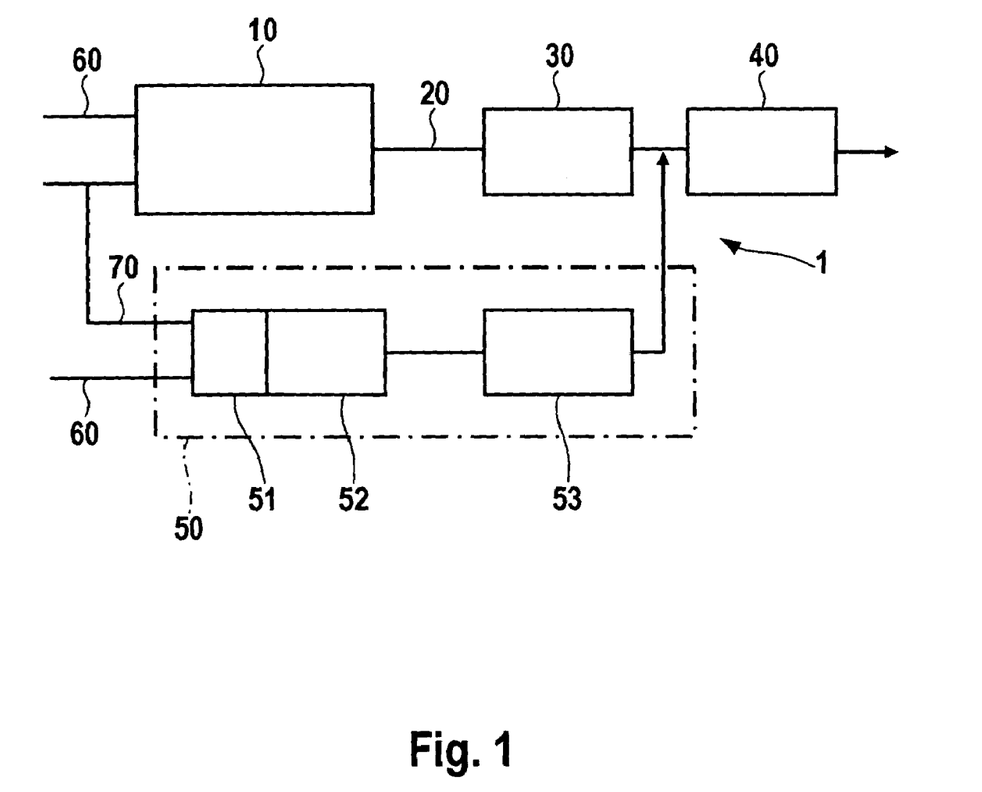
FIG. 1 shows a schematic of an exhaust gas aftertreatment system for a combustion engine with a reducing agent generating system.

FIG. 1 shows a schematic of the technical context as exemplified by a diesel engine in which the invented process can be used.

Shown is an exhaust gas aftertreatment system 1 for a combustion engine 10, whose exhaust gases are directed through an exhaust gas pipe 20, whereby in the direction of flow of the exhaust gas a diesel particle filter 30 (DPF) and a downstream SCR catalyzer 40 are provided. For reduction of nitric oxides, ammonia from a reducing agent generating system 50 (RGS) can be injected as a reducing agent before the SCR catalyzer 40. SCR catalyzers 40 work on the principle of the selective catalytic reduction, in which the reducing agent ammonia is used to reduce oxygen-containing nitric oxide into nitrogen and water.

The reducing agent generating system 50 has an $NO_x$ and $CO/H_2$ generating unit 51 in the direction of flow, which contains an oxidation catalyst 52 (cPOx) along with a combined $NO_x$ storage/ammonia generating unit 53 (AGC unit). Precursor materials for the generation of ammonia can be directed at least temporarily to the $NO_x$ and $CO/H_2$ generating unit 51 through an air pipe 70 and a fuel pipe 60. The ammonia is generated from air, exhaust, or a mixture of air and exhaust and, in the example shown, diesel fuel. For this purpose there are a hydrogen generating unit and a nitric oxide generating unit. In the example shown, the $NO_x$ generating unit is implemented as a plasma reactor in which $NO_x$ is generated from air using a glow discharge-like process. The plasma reactor in this example also includes the oxidation catalyst 52 (cPOx) downstream of the $NO_x$ generating unit.

The generation of ammonia occurs within the reducing agent generating system 50 when nitric oxides $NO_x$ are generated from air in a plasma process within the plasma reactor during a lean phase ($\lambda>1$). These nitric oxides flow through the connected oxidation catalyst 52 and are then, in the example shown, directed to a combined $NO_x$ storage ammonia generation unit 53 and stored. In a second operating phase subsequent to the lean phase, the rich phase ($0.33<\lambda<1$), in the area of the plasma reactor in a vaporization and mixture formation zone, fluid fuel is dosed into the air and converted in the oxidation catalyzer 52 into a hydrogen and carbon monoxide containing gas mixture, which then converts the previously stored nitric oxides into ammonia in the area of the $NO_x$ storage/ammonia generating unit 53. The generated gaseous ammonia is then injected into the exhaust gas stream of the exhaust gas pipe 20 before the SCR catalyzer 40.

Since the SCR catalyzer 40 has an ammonia storage capability, it is possible even during a discontinuous process of ammonia generation to achieve continuous reduction of nitric oxides using the SCR process in the exhaust gas stream. Here, in the temperature range between 150° C. and 450° C., catalysts made of, for instance, titanium dioxide ($TiO_2$) and vanadium pentoxide ($V_2O_5$) convert the nitric oxides to ammonia at a higher rate.

The reducing agent quantity for regeneration of an $NO_x$ storage catalyzer, like the $NO_x$ storage/ammonia generating unit 53 in FIG. 1, can be described in a simplified manner using the reaction $$n(H_2/CO) \sim c(H_2/CO) \times \Delta t_{rich} \times m_{Diesel}$$

Here, n ($H_2/CO$) is the total amount of $H_2$ and CO introduced into the $NO_x$ storage catalyzer, c ($H_2$/co) is the total reducing agent concentration of $H_2$ and CO, whereby HC portions are not taken into consideration, $m_{Diesel}$ is the diesel mass flow used for the generation of $H_2$ and CO or a diesel power 100 proportional to that, and $\Delta t_{rich}$ is the duration of the rich phase with $\lambda<1$. This description is initially independent of the type of operation (RGS or full stream NSC). This equation results in the already familiar approaches for the minimization of n ($H_2/CO$). Increase in lambda represents one possibility.

In conventional, e.g. engine regeneration of $NO_x$ storage catalysts, the concentration c ($H_2/CO$) can be changed by changing the lambda value ($0.8<\lambda<1$), particularly through simple changes to the injection amount with relatively constant air volume. This approach and particularly the actually similar increase in lambda are—due to process technology limitations—not transferable to the reducing agent generating system 50. The $H_2/CO$ mixture for ammonia generation in the $NO_x$ storage/ammonia generating unit 53 (AGC unit) is generated catalytically in the reducing agent generating unit on the oxidation catalyst 52 (cPOx catalyst) in the lambda range between 0.33 and 0.42. This corresponds to about 40%<c ($H_2/CO$)<about 45%. Lowering c ($H_2/CO$) by increasing lambda (e.g. by reducing the amount of diesel injected) over the course of several seconds, typically 3 to 6 seconds, would destroy the cPOx stage due to the immense amount of heat released (T>>1000° C.).

A different method is a reduction in the duration of the rich phase. The reduction of the rich phase duration to reduce overdosing is feasible in principle if the $NO_x$ loading density of the AGC unit is also reduced at the same time. However, this process also runs into process technological limits: on the one hand, this is a kinetic limitation of the reduction of the $NO_x$ storage catalyst; on the other hand the parasitic heat portions, often associated with strong heat tinging (e.g. mixture losses from the rich/lean transition and vice versa and in the cPOx stage, reducing agent consumption due to oxygen storage components in the AGC unit, etc.) reduce the ammonia yield.

Thus the invention provides that the $CO/H_2$ reducing agent flow be temporally modulated during the rich phase 90 with $\lambda<1$ serving as the reducing phase for the $NO_x$ storage/ammonia generating unit 53, whereby a $CO/H_2$ concentration at a high level (>30%, typically up to 40%) is held approximately constant, whereby a largely constant lambda value 130 is maintained in the oxidation catalyzer 52, corresponding to a performance modulation at constant lambda value within the oxidation catalyzer 52 (cPOx stage).

First, in a preferred operating method of the reducing agent generating system 50, the $NO_x$ storage/ammonia generating unit 53 (AGC unit) is loaded in the lean period for about 30 seconds with, for example, nitric oxides generated from a plasma process, to an $NO_x$ loading density of about 2 g $NO_2$/$liter_{AGC}$. The $NO_x$ loading phase runs normally at constant gas volume flow and thus constant spatial velocity. The rich phase, and thus the reducing phase, is now introduced by injecting fuel through the fuel feed 60 into the $NO_x$ and $CO/H_2$ generating unit 51 at constant air flow, whereby a target lambda value 130 of 0.33 to 0.45 is maintained. After the start of the fuel injection, the air volume flow and fuel mass flow is temporarily held constant, typically for 3 seconds. After about 3 seconds, the air volume flow and fuel mass flow is continually reduced after the constant phase while maintaining the lambda value 130, whereby a "fade-out" of the total reformate gas occurs with nearly constant reformate gas composition.

In contrast to this, in a process variant the air volume flow and fuel mass flow can be continuously reduced after the constant phase and thereby simultaneously the lambda value 130 increased, whereby the lambda value 130 is increased from a level in the range between 0.33 and 0.45 to a level in the range between 0.7 and 0.9, typically 0.8. The diesel quantity is thus reduced overproportionally to the air volume in comparison with the previously described variants.

An increase in the lambda value from a level in the range between 0.33 and 0.45 to a level in the range $\lambda \geq 1$ represents an additional process variant and corresponds to a rinsing of the AGC unit with the inert combustion products $CO_2$ and $H_2O$.

In a further variant of the process it can be provided that the rich phase 90 is preceded for a short time (maximum 1 second) by a phase with a lower or higher lambda value 130 than the lambda value 130 specified within the rich phase, whereby during this prior phase the air volume flow can at first be held constant.

During this phase, called the "lambda sweep", also at the beginning of the rich phase with constant lambda value, an air volume and fuel mass flow initially increased in comparison to the air volume and fuel mass flows set for the remaining duration of the rich phase.

With regards to a desulfatization of the AGC unit, it has shown that when the process is used as previously described, generation of a variable lambda profile in the oxidation catalyzer 52 and a periodic switch between a lean and a rich gas composition is advantageous.

According to the invention, it is provided that the temporal modulation of the $CO/H_2$ reducing agent flow, of the air volume and fuel mass flows, and the specification of the lambda value 130 is controlled by a control unit, whereby hardware and software components are used to specify an appropriate valve control characteristic for injection valves in the fuel feed as well as an appropriate performance characteristic for an air supply system for the air feed. This particularly includes fast modulation capability for the air supply system of the reducing agent generating system 50.

An example of the process is shown in the temporal behaviors in FIG. 2 through 6 of diesel power 100, reformate gas flow 110, and lambda value 130.

Figure 2:
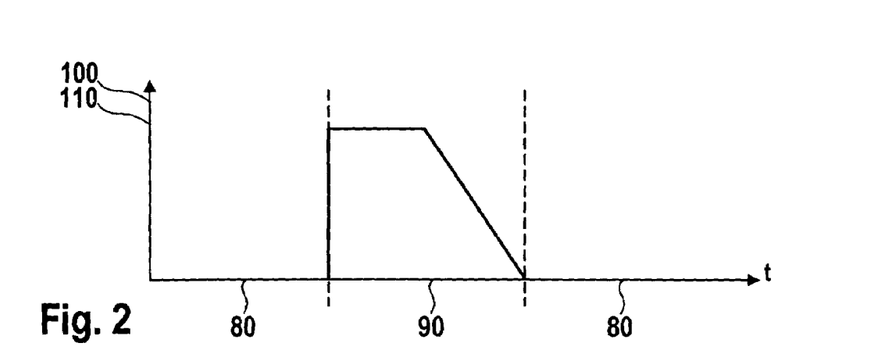
FIG. 2 shows an example of a change to diesel power or reformate gas flow with constant lambda (cPOx) during a rich phase of AGC regeneration.

FIG. 2 shows an example of a change in diesel power 100 or in reformate gas flow 110 at a constant lambda value 130 (cPOx) during the rich phase 90 of AGC regeneration, temporally embedded between lean phases 80. After a steep increase in diesel power 100 or of the reformate gas flow 110 with a subsequent constant level, the subsequent, decreasing part of the air volume flow is decreased simultaneously with the diesel power 100.

Figure 3:
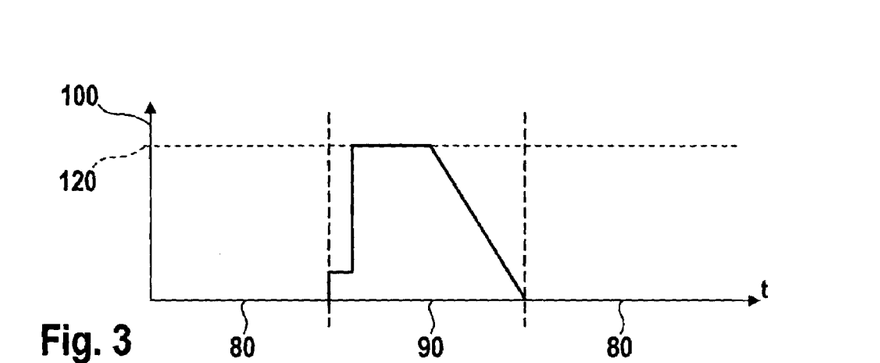
FIG. 3 shows an example of a change to diesel power in a rich phase with a prior lambda-sweep.

In FIG. 3, an example is shown of a change in diesel power in the rich phase 90 with a prior lambda sweep, here with a lambda of e.g. 0.8, during the rich phase of AGC regeneration. As already shown in FIG. 2, the subsequent falling part of the air volume flow is simultaneously reduced with diesel power 100.

Figure 4:
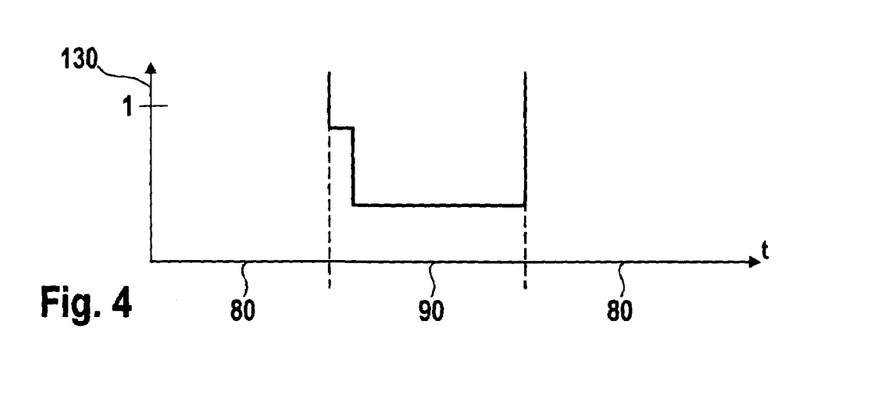
FIG. 4 shows an example lambda behavior in the cPOx catalyst upstream of the AGC.

FIG. 4 shows a behavior for the lambda value 130 in the oxidation catalyzer 52 (cPOx) upstream of the $NO_x$ storage/ammonia generating unit 53 (AGC unit), with the change in diesel power 100 with a prior lambda sweep (lambda=0.8) during rich phase 90 of the AGC regeneration, corresponding to FIG. 3.

Figure 5:
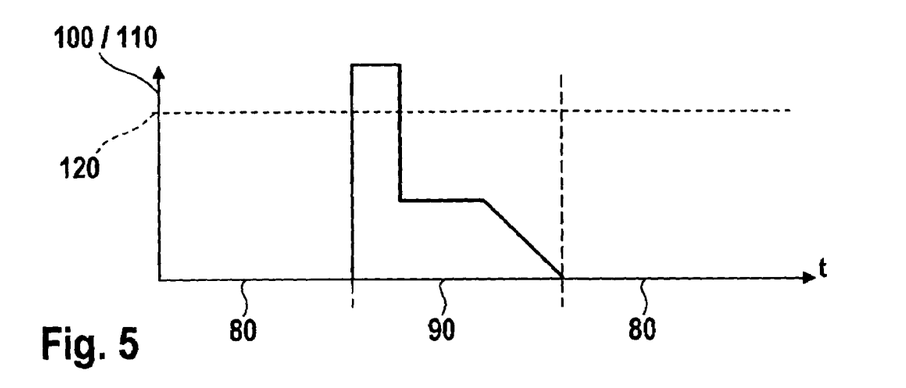
FIG. 5 shows another example of a change to diesel power or reformate gas flow with constant lambda (cPOx) during the rich phase of AGC regeneration.

In FIG. 5, another example is shown of a change in diesel power 100 or reformate gas flow 110 with constant lambda value 130 (cPOx) during rich phase 90 of AGC regeneration. In the example show, at the start of rich phase 90, the diesel power 100 or the reformate gas flow 110 is specifically increased beyond a design level 120.

Figure 6:
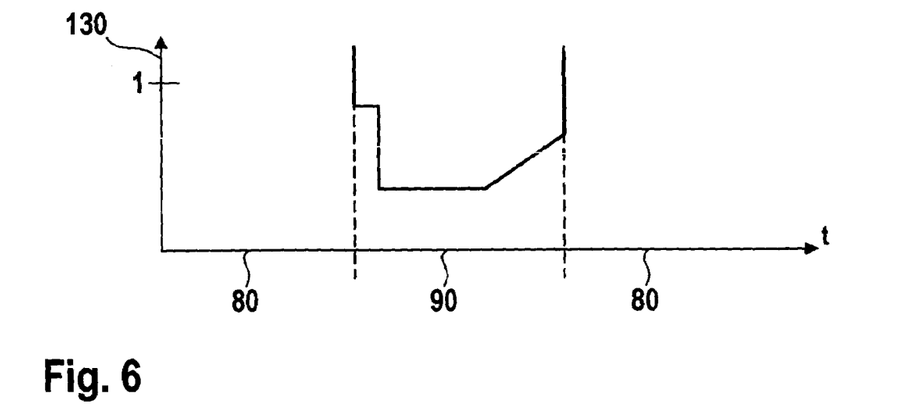
FIG. 6 shows another example lambda behavior in the cPOx catalyst upstream of the AGC.

FIG. 6 shows another behavior for lambda value 130 in the oxidation catalyzer 52 (cPOx) upstream of the $NO_x$ storage/ammonia generating unit 53 (AGC unit), with the change in diesel power 100, with a first, prior lambda sweep (lambda=0.8) at constant air volume, and with a second lambda sweep after rich phase 90, during rich phase 90 of AGC regeneration. During the subsequent lambda sweep, the air volume and the lambda value 130 are changed simultaneously.

The process can essentially be used for all vehicles with diesel or lean engines operated with other fuels, in which a reducing agent generating system 50 as an on-board ammonia generator is used.

In all, the process shown and the process variants can be used to reduce the secondary emissions from the RGS unit. Furthermore, at higher ammonia yields in the AGC unit, the overdosing of $H_2/CO$ and thus ultimately the additional fuel consumption can be limited. Advantages also result from the use of the process with regards to the desulfatization of the AGC unit.

The invention claimed is:

1. A method of reducing agent control in an exhaust gas aftertreatment system of a combustion engine with an exhaust gas pipe in which in the direction of flow of the exhaust gas there is an SCR catalyzer, whereby a reducing agent generating system has an $NO_x$ and $CO/H_2$ generating unit, an oxidation catalyzer, and a combined $NO_x$ storage/ammonia generating unit in a standard gas path of the reducing agent generating system, the method comprising: introducing ammonia as a reducing agent for a reduction of nitric oxides before the SCR catalyzer of the reducing agent generating system and directing, at least temporarily, precursor materials for generation of ammonia to the $NO_x$ and $CO/H_2$ generating unit through a fuel feed and an air feed, wherein a $CO/H_2$ reducing agent stream is temporally modulated during a rich phase with $\lambda<1$ serving as a reducing phase for the $NO_x$ storage/ammonia generating unit, whereby a $CO/H_2$ concentration is primarily held constant at a high level.

2. A method according to claim 1, further comprising maintaining a primary constant lambda value in the oxidation catalyzer.

3. A method according to claim 1, wherein the rich phase is introduced by injection of fuel through the fuel feed into the $NO_x$ and $CO/H_2$ generating unit at constant air flow.

4. A method according to claim 1, wherein the injection of fuel is performed at a lambda value in the range between 0.33 and 0.45.

5. A method according to claim 1, further comprising temporarily holding constant the air volume flow and the fuel mass flow after the start of the fuel injection.

6. A method according to claim 5, wherein the air volume flow and the fuel mass flow are held constant for at least 1 second and at most for 4 seconds.

7. A method according to claim 1, further comprising continuously reducing the air volume flow and the fuel mass flow after the constant phase while maintaining the lambda value.

8. A method according to claim 1, further comprising continuously reducing the air volume flow and the fuel mass flow after the constant phase and thereby the lambda value is simultaneously increased.

9. A method according to claim 8, wherein the lambda value is increased from a level in the range from 0.33 to 0.45 to a level in the range from 0.7 to 0.9.

10. A method according to claim 8, wherein the lambda value is increased from a level in the range from 0.33 to 0.45 to a level in the range of $\lambda \geqq 1$.

11. A method according to claim 1, wherein the rich phase is preceded for a maximum of 1 second by a phase with a lower or higher lambda value than the lambda value within the rich phase.

12. A method according to claim 11, wherein during this prior phase the air volume flow is held constant.

13. A method according to claim 1, wherein at the start of the rich phase at constant lambda value an increased air volume and fuel mass flow is specified compared to the air volume and fuel mass flow specified for the remaining duration of the rich phase.

14. A method according to claim 1, wherein a variable lambda profile is generated in the oxidation catalyzer.

15. A method according to claim 1, wherein there is a periodic switch between a lean and a rich gas composition.

16. A method according to claim 1, wherein the temporal modulation of the $CO/H_2$ reducing agent flow, the air volume and fuel mass flows, and the specification of the lambda value are controlled by a control unit, whereby hardware and software components are used to specify an appropriate valve control characteristic for injection valves in the fuel feed and an appropriate performance characteristic for an air supply system for the air feed.

17. A method according to claim 1, wherein the method is used for diesel engines or for lean engines which have a reducing agent generating system.

* * * * *

UNITED STATES PATENT AND TRADEMARK OFFICE
CERTIFICATE OF CORRECTION

PATENT NO. : 7,731,925 B2  Page 1 of 1
APPLICATION NO. : 11/599899
DATED : June 8, 2010
INVENTOR(S) : Gloeckle

It is certified that error appears in the above-identified patent and that said Letters Patent is hereby corrected as shown below:

Col. 1, line 20: "bum engines, $NO_x$" should read --burn engines, $NO_x$--

Col. 3, line 13: "aummonia generation outside" should read --ammonia generation outside--

Signed and Sealed this

Sixteenth Day of November, 2010

David J. Kappos
*Director of the United States Patent and Trademark Office*